(12) United States Patent
Ueno et al.

(10) Patent No.: US 12,466,423 B2
(45) Date of Patent: Nov. 11, 2025

(54) INFORMATION PROCESSING DEVICE

(71) Applicants: TOYOTA JIDOSHA KABUSHIKI KAISHA, Toyota (JP); ADVICS CO., LTD., Kariya (JP)

(72) Inventors: Hiroshi Ueno, Toyota (JP); Yoshihisa Yamada, Nagoya (JP); Tomoya Tanaka, Kariya (JP); Yasufumi Enami, Kariya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 59 days.

(21) Appl. No.: 18/413,536

(22) Filed: Jan. 16, 2024

(65) Prior Publication Data
US 2024/0270269 A1  Aug. 15, 2024

(30) Foreign Application Priority Data
Feb. 14, 2023 (JP) ................. 2023-020755

(51) Int. Cl.
*B60W 50/14* (2020.01)
*B60W 30/17* (2020.01)
*B60W 50/02* (2012.01)

(52) U.S. Cl.
CPC ............ *B60W 50/14* (2013.01); *B60W 30/17* (2013.01); *B60W 50/0205* (2013.01); *B60W 2050/021* (2013.01); *B60W 2050/143* (2013.01); *B60W 2050/146* (2013.01); *B60W 2520/10* (2013.01); *B60W 2540/106* (2013.01); *B60W 2540/18* (2013.01); *B60W 2554/802* (2020.02)

(58) Field of Classification Search
CPC ...................................... B60W 50/14
See application file for complete search history.

(56) References Cited

U.S. PATENT DOCUMENTS

| | | | | |
|---|---|---|---|---|
| 5,420,792 A | * | 5/1995 | Butsuen ............ | B60K 31/0008 180/170 |
| 6,679,702 B1 | * | 1/2004 | Rau ......................... | G09B 9/02 434/62 |
| 2008/0183360 A1 | * | 7/2008 | Zhang .................... | B60W 50/14 340/436 |
| 2010/0274435 A1 | | 10/2010 | Kondoh et al. | |
| 2017/0365165 A1 | * | 12/2017 | Landfors ............... | G06F 16/182 |

FOREIGN PATENT DOCUMENTS

| | | |
|---|---|---|
| JP | 2019-012481 A | 1/2019 |
| WO | 2009/013816 A1 | 1/2009 |

\* cited by examiner

*Primary Examiner* — Travis R Hunnings
(74) *Attorney, Agent, or Firm* — Oliff PLC

(57) ABSTRACT

An information processing device includes a processor. The processor acquires an operation amount for acceleration/deceleration of a first vehicle by a driver of the first vehicle. The processor acquires an inter-vehicle distance from the first vehicle to a second vehicle traveling ahead of the first vehicle. The processor determines whether the operation amount meets a first specific condition determined in advance. The processor determines whether the inter-vehicle distance meets a second specific condition determined in advance. The processor calculates a diagnosis result about the inter-vehicle distance based on the inter-vehicle distance acquired when the processor determines that both the first specific condition and the second specific condition are met. The processor outputs the diagnosis result.

8 Claims, 3 Drawing Sheets

INFORMATION PROCESSING DEVICE

CROSS-REFERENCE TO RELATED APPLICATION

This application claims priority to Japanese Patent Application No. 2023-020755 filed on Feb. 14, 2023, incorporated herein by reference in its entirety.

BACKGROUND

1. Technical Field

The present disclosure relates to an information processing device.

2. Description of Related Art

Japanese Unexamined Patent Application Publication No. 2019-012481 (JP 2019-012481 A) discloses a vehicle including a driving diagnosis device, various sensors, and a display device. The driving diagnosis device acquires operation information about driving operations by a driver of the vehicle from the various sensors. The driving diagnosis device diagnoses the driving skills of the driver of the vehicle based on the acquired operation information. The driving diagnosis device outputs a diagnosis result of the driving skills to the display device.

The inter-vehicle distance between a vehicle and a preceding vehicle that precedes the vehicle is affected by not only the acceleration/deceleration behavior of the vehicle but also the acceleration/deceleration behavior of the preceding vehicle. The driving skills of a driver are necessarily high even if the inter-vehicle distance between a vehicle and a preceding vehicle at a certain timing has an ideal value. The driving diagnosis device disclosed in JP 2019-012481 A does not consider at all diagnosing parameters affected by such behavior of the preceding vehicle.

SUMMARY

An aspect of the present disclosure provides an information processing device including one or more processors. The one or more processors are configured to acquire an operation amount for acceleration/deceleration of a first vehicle by a driver of the first vehicle. The one or more processors are configured to acquire an inter-vehicle distance from the first vehicle to a second vehicle traveling ahead of the first vehicle. The one or more processors are configured to determine whether the operation amount meets a first specific condition determined in advance. The one or more processors are configured to determine whether the inter-vehicle distance meets a second specific condition determined in advance. The one or more processors are configured to calculate a diagnosis result about the inter-vehicle distance based on the inter-vehicle distance acquired when the one or more processors determine that both the first specific condition and the second specific condition are met. The one or more processors are configured to output the diagnosis result.

In the above configuration, there is a high possibility that the driver of the vehicle has tried to accelerate or decelerate the vehicle by his/her own intention while considering the behavior of the preceding vehicle when the amount of operation for acceleration/deceleration of the vehicle meets the first specific condition and the inter-vehicle distance meets the second specific condition. Thus, there is a high possibility that the inter-vehicle distance at this time reflects the driving skills of the driver of the vehicle. According to the above configuration, a diagnosis result is calculated based on the inter-vehicle distance at the time when both the first specific condition and the second specific condition are met, and thus it is possible to output a diagnosis result that reflects the driving skills of the driver of the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Schematic Configuration of Information Processing System

An embodiment of the present disclosure will be described below with reference to FIGS. 1 to 3. First, a schematic configuration of an information processing system IS will be described.

Figure 1:
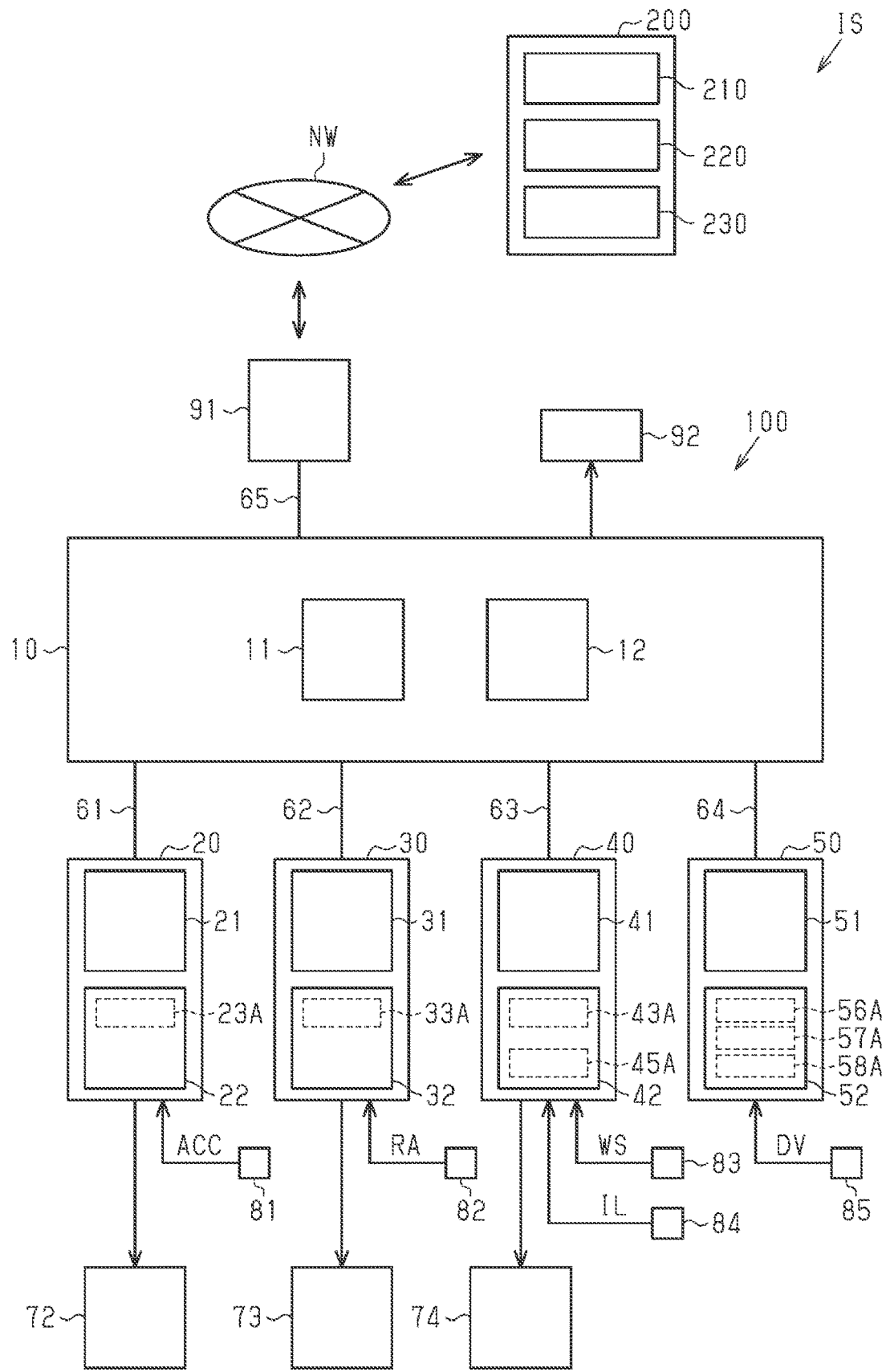
FIG. 1 illustrates a schematic configuration of an information processing system.

As illustrated in FIG. 1, the information processing system IS includes a vehicle 100. The vehicle 100 may be an automobile owned by a user, for example. The vehicle 100 includes a power train device 72, a steering device 73, and a brake device 74. The power train device 72 includes an engine, a transmission, etc. The engine can apply a drive force to driving wheels of the vehicle 100 via the transmission. The steering device 73 may be a rack and pinion electric steering device, by way of example. The steering device 73 can change the direction of a steering wheel of the vehicle 100 by controlling a rack and a pinion (not illustrated). The brake device 74 generates a braking force for the vehicle 100. The brake device 74 is a so-called mechanical brake device that mechanically brakes the wheels of vehicle 100. The brake device 74 may be a disc brake, by way of example.

As illustrated in FIG. 1, the vehicle 100 includes a central ECU 10, a power train ECU 20, a steering ECU 30, a brake ECU 40, and an advanced driver assistance ECU 50. The vehicle 100 also includes a first external bus 61, a second external bus 62, a third external bus 63, a fourth external bus 64, and a fifth external bus 65. The term "ECU" is an abbreviation for "Electronic Control Unit".

The central ECU 10 integrally controls the entire vehicle 100. The central ECU 10 includes a central processing unit (CPU) 11 and a storage device 12. The storage device 12 stores various programs and various kinds of data in advance. The storage device 12 includes a read only memory (ROM), a random access memory (RAM), and a storage. The CPU 11 implements various processes by executing the programs stored in the storage device 12.

The power train ECU 20 can communicate with the central ECU 10 via the first external bus 61. The power train ECU 20 controls the power train device 72 by outputting a control signal to the power train device 72. The power train ECU 20 includes a CPU 21 and a storage device 22. The storage device 22 stores various programs and various kinds of data in advance. The storage device 22 stores a power train app 23A as one of the various programs. The power train app 23A is application software for controlling the power train device 72. The storage device 22 includes a ROM, a RAM, and a storage. The CPU 21 implements a function as a power train control unit 23, to be discussed later, by executing the power train app 23A stored in the storage device 22.

The steering ECU 30 can communicate with the central ECU 10 via the second external bus 62. The steering ECU 30 controls the steering device 73 by outputting a control signal to the steering device 73. The steering ECU 30 includes a CPU 31 and a storage device 32. The storage device 32 stores various programs and various kinds of data in advance. The storage device 32 stores a steering app 33A as one of the various programs. The steering app 33A is application software for controlling the steering device 73. The storage device 32 includes a ROM, a RAM, and a storage. The CPU 31 implements a function as a steering control unit 33, to be discussed later, by executing the steering app 33A stored in the storage device 32.

The brake ECU 40 can communicate with the central ECU 10 via the third external bus 63. The brake ECU 40 controls the brake device 74 by outputting a control signal to the brake device 74. The brake ECU 40 includes a CPU 41 and a storage device 42. The storage device 42 stores various programs and various kinds of data in advance. The storage device 42 stores a brake app 43A as one of the various programs. The brake app 43A is application software for controlling the brake device 74. The storage device 42 further stores a motion manager app 45A as one of the various programs. The motion manager app 45A is application software for mediating a plurality of motion requests. The storage device 42 includes a ROM, a RAM, and a storage. The CPU 41 implements a function as a brake control unit 43, to be discussed later, by executing the brake app 43A stored in the storage device 42. In addition, the CPU 41 implements a function as a motion manager 45, to be discussed later, by executing the motion manager app 45A stored in the storage device 42. In the present embodiment, the brake ECU 40 is an example of an information processing device.

The advanced driver assistance ECU 50 can communicate with the central ECU 10 via the fourth external bus 64. The advanced driver assistance ECU 50 executes various kinds of driver assistance. The advanced driver assistance ECU 50 includes a CPU 51 and a storage device 52. The storage device 52 stores various programs and various kinds of data in advance. The various programs include a first assistance app 56A, a second assistance app 57A, and a third assistance app 58A. The first assistance app 56A may be application software for collision damage mitigation braking, that is, so-called autonomous emergency braking (AEB), that automatically applies braking in order to mitigate the damage of a collision to the vehicle 100, by way of example. The second assistance app 57A may be application software for so-called lane keeping assist (LKA) that maintains the lane in which the vehicle 100 is traveling, by way of example. The third assistance app 58A may be application software for so-called adaptive cruise control (ACC) that allows the vehicle 100 to follow a preceding vehicle traveling ahead of the vehicle 100 while keeping the inter-vehicle distance constant, by way of example. In the present embodiment, the first assistance app 56A, the second assistance app 57A, and the third assistance app 58A are each application software for implementing driver assistance functions of the vehicle 100. The storage device 52 includes a ROM, a RAM, and a storage. The CPU 51 implements a function as a first assistance unit 56, to be discussed later, by executing the first assistance app 56A stored in the storage device 52. The CPU 51 implements a function as a second assistance unit 57, to be discussed later, by executing the second assistance app 57A stored in the storage device 52. The CPU 51 implements a function as a third assistance unit 58, to be discussed later, by executing the third assistance app 58A stored in the storage device 52.

As illustrated in FIG. 1, the vehicle 100 includes an accelerator operation amount sensor 81, a steering angle sensor 82, a plurality of wheel speed sensors 83, an illuminance sensor 84, and an inter-vehicle distance sensor 85. The accelerator operation amount sensor 81 detects an accelerator operation amount ACC that is the operation amount of an accelerator pedal operated by a driver. In the present embodiment, the accelerator operation amount ACC is zero when the driver is not operating the accelerator pedal. On the other hand, the accelerator operation amount ACC has a positive value when the driver is operating the accelerator pedal. At this time, the accelerator operation amount ACC is larger as the amount by which the driver steps on the accelerator pedal is larger.

The steering angle sensor 82 detects a steering angle RA that is the angle of the steering wheel operated by the driver. In the present embodiment, the steering angle RA is zero when the steering wheel is operated such that the vehicle 100 travels straight. Meanwhile, the steering angle RA has a positive value when the steering wheel is operated such that the vehicle 100 turns right. On the other hand, the steering angle RA has a negative value when the steering wheel is operated such that the vehicle 100 turns left.

The wheel speed sensor 83 detects a wheel speed WS that is the rotational speed of a wheel of the vehicle 100. The wheel speed sensor 83 is positioned in the vicinity of each wheel of the vehicle 100. In the present embodiment, the vehicle 100 includes four wheel speed sensors 83 in correspondence with four wheels of the vehicle 100. In FIG. 1, only one wheel speed sensor 83 is illustrated as a representative.

The illuminance sensor 84 detects an illuminance IL at the location at which the vehicle 100 is positioned. The inter-vehicle distance sensor 85 detects an inter-vehicle distance DV that is the distance from the vehicle 100 to a preceding vehicle traveling ahead of the vehicle 100. The inter-vehicle distance sensor 85 may be a LIDAR, by way of example. The term "LIDAR" is an abbreviation for "Laser Imaging Detection and Ranging".

The power train ECU 20 acquires a signal that indicates the accelerator operation amount ACC from the accelerator operation amount sensor 81. The steering ECU 30 acquires a signal that indicates the steering angle RA from the steering angle sensor 82. The brake ECU 40 acquires signals that indicate four wheel speeds WS from the four wheel speed sensors 83. The brake ECU 40 also acquires a signal that indicates the illuminance IL from the illuminance sensor 84. The advanced driver assistance ECU 50 acquires a signal that indicates the inter-vehicle distance DV from the inter-vehicle distance sensor 85. The brake ECU 40 can acquire various kinds of information, including the accelerator operation amount ACC, the steering angle RA, and the inter-vehicle distance DV, via the central ECU 10. In the present embodiment, the accelerator operation amount ACC corresponds to the amount of operation for acceleration/deceleration of the vehicle 100 by the driver of the vehicle 100.

The brake ECU 40 calculates a vehicle speed SP that is the speed of the vehicle 100 in each control cycle determined in advance. For example, the brake ECU 40 calculates the vehicle speed SP by multiplying an average value of the four wheel speeds WS by a coefficient determined in advance. In addition, the brake ECU 40 sets a slip flag SF that indicates the slipperiness at the location at which the vehicle 100 is positioned in each control cycle determined in advance. The brake ECU 40 sets the slip flag SF to ON when the difference between the largest value and the smallest value of the four wheel speeds WS is equal to or more than a prescribed value determined in advance, for example. In a specific example, the brake ECU 40 sets the slip flag SF to ON when a road surface at the location at which the vehicle 100 is positioned is slippery e.g. since the road surface is wet. On the other hand, the brake ECU 40 sets the slip flag SF to OFF when the difference between the largest value and the smallest value of the four wheel speeds WS is less than the prescribed value determined in advance.

As illustrated in FIG. 1, the vehicle 100 includes a DCM 91 and a display 92. The DCM 91 is connected to the central ECU 10 via the fifth external bus 65. The DCM 91 can wirelessly communicate with a device outside the vehicle 100 via a communication network NW. The term "DCM" is an abbreviation for "Data Communication Module". The display 92 is connected to the central ECU 10. The display 92 can display various kinds of information.

As illustrated in FIG. 1, the information processing system IS includes a data center 200. The data center 200 may be a so-called server, by way of example. The data center 200 includes a CPU 210, a storage device 220, and a communication device 230. The communication device 230 can communicate with a device outside the data center 200 via the communication network NW.

Basic Configuration of Motion Manager

Next, the basic configuration of the motion manager 45 will be described with reference to FIG. 2. As illustrated in FIG. 2, the motion manager 45 can communicate with the first assistance unit 56, the second assistance unit 57, and the third assistance unit 58. The motion manager 45 can also communicate with the power train control unit 23, the steering control unit 33, and the brake control unit 43.

The first assistance unit 56, the second assistance unit 57, and the third assistance unit 58 output acceleration request values to the motion manager 45 as motion requests when executing various kinds of control. At this time, the first assistance unit 56, the second assistance unit 57, and the third assistance unit 58 continuously output the acceleration request values since the various kinds of control are needed until such control is not needed any more, for example.

Figure 2:
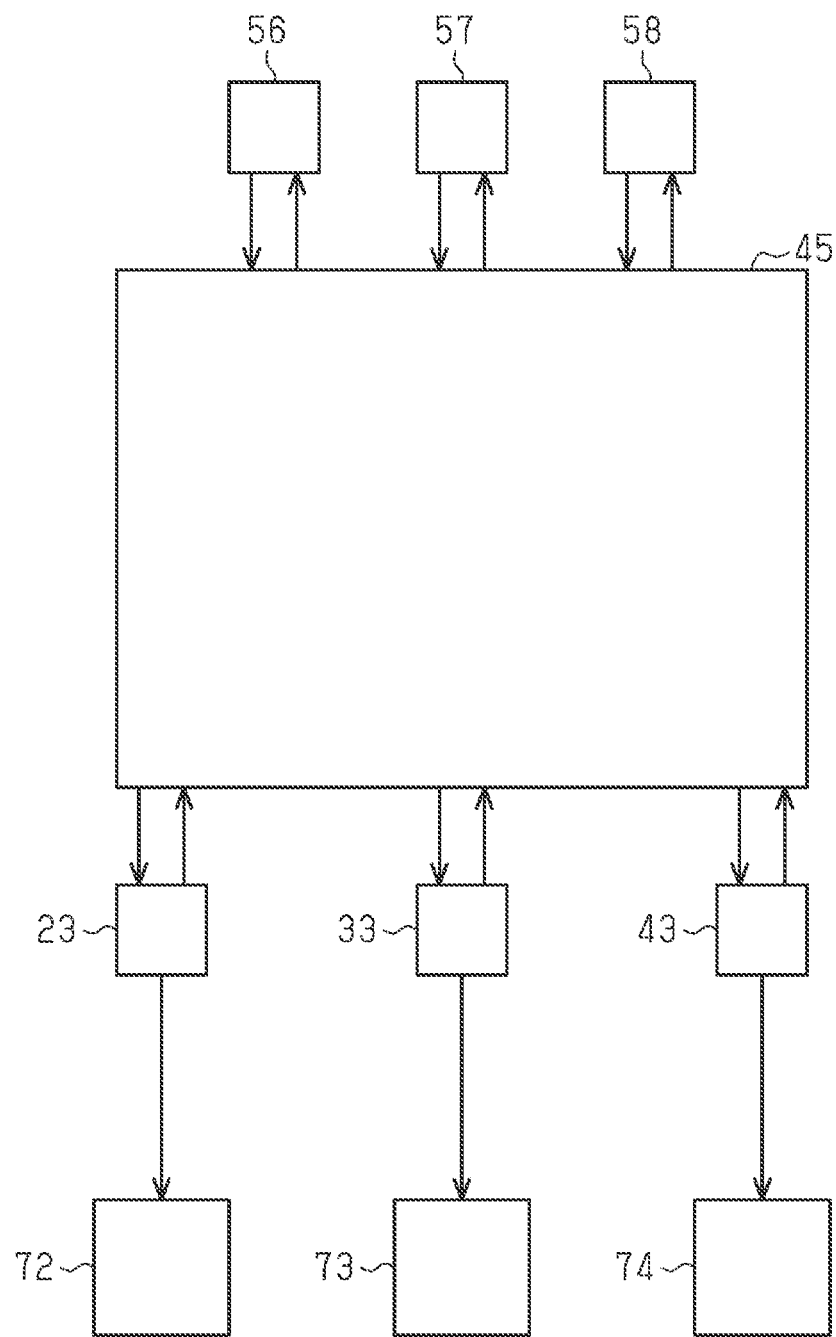
FIG. 2 is a functional block diagram illustrating the basic configuration of a motion manager.

As illustrated in FIG. 2, the motion manager 45 receives the acceleration request values from the first assistance unit 56, the second assistance unit 57, and the third assistance unit 58. In addition, the motion manager 45 mediates the received acceleration request values. Further, the motion manager 45 generates an instruction value for an operation request for controlling various actuators based on mediation results. Then, the motion manager 45 outputs the generated instruction value to a control unit corresponding to each actuator. For example, when an instruction value for controlling the power train device 72 is generated, the motion manager 45 outputs the instruction value to the power train control unit 23. Similarly, the motion manager 45 outputs an instruction value to the steering control unit 33 and the brake control unit 43.

Diagnosis Control

Next, diagnosis control executed by the motion manager 45 will be described with reference to FIG. 3. The motion manager 45 repeatedly executes the diagnosis control in each control cycle determined in advance.

Figure 3:
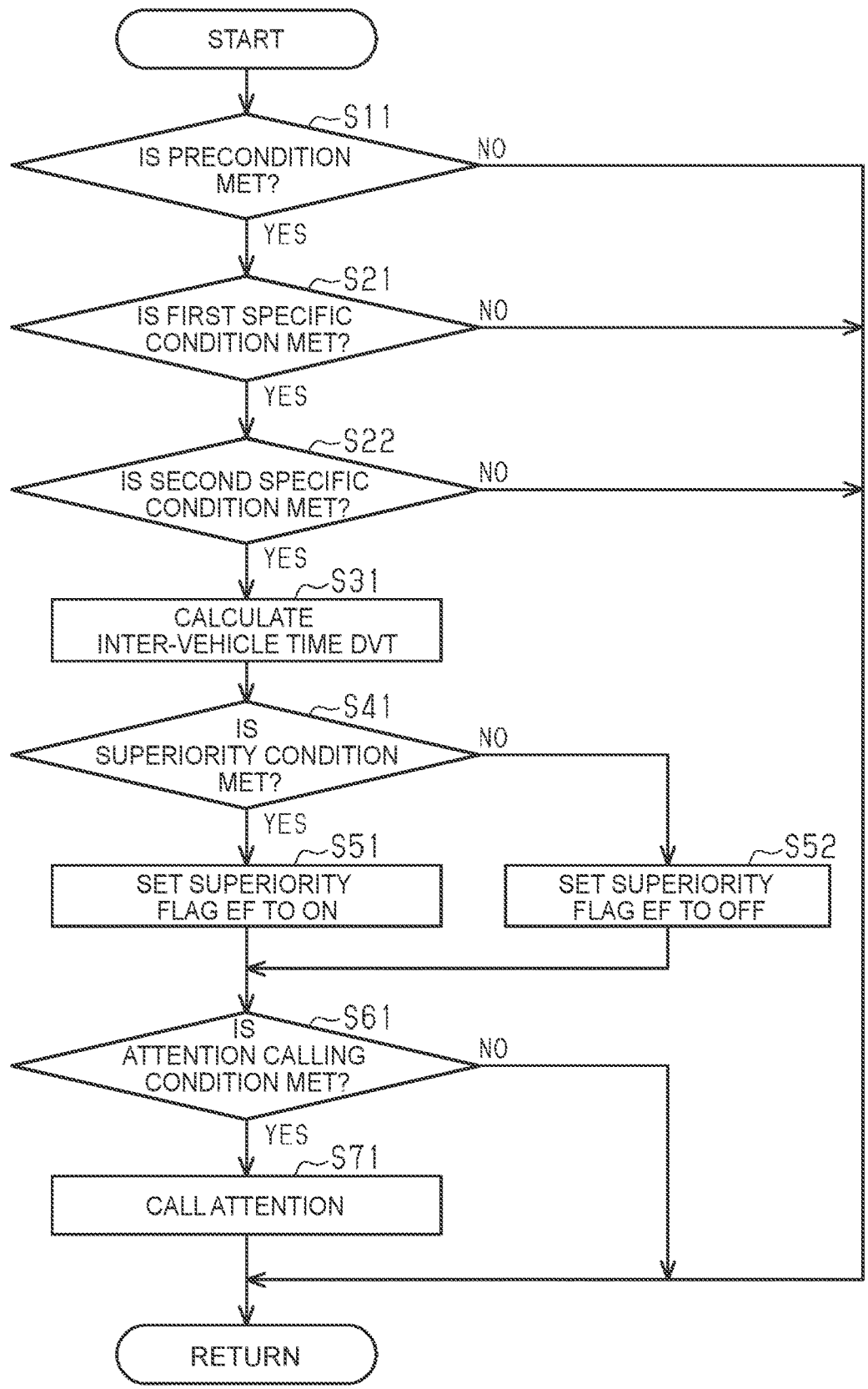
FIG. 3 is a flowchart illustrating diagnosis control.

When the diagnosis control is started, as illustrated in FIG. 3, the motion manager 45 executes the process in step S11. In step S11, the motion manager 45 determines whether a precondition determined in advance is met. Specifically, the motion manager 45 determines that the precondition is met when all of the following requirements (1-1) to (1-3) are met.

Requirement (1-1): the steering angle RA is within a prescribed range determined in advance including zero. Here, the prescribed range is a range determined to determine that the steering wheel is operated such that the vehicle 100 travels straight. The prescribed range may be within ±several degrees, by way of example.

Requirement (1-2): the vehicle speed SP is equal to or more than a prescribed speed determined in advance. Here, the prescribed speed is a threshold for determining whether the vehicle 100 is traveling. The prescribed speed may be several kilometers per hour to 10-odd kilometers per hour, by way of example.

Requirement (1-3): the power train device 72, the steering device 73, and the brake device 74 are not controlled according to motion requests from the first assistance unit 56, the second assistance unit 57, and the third assistance unit 58.

That is, the requirement (1-3) is a requirement for determining whether the driver himself/herself is driving the vehicle 100. When the motion manager 45 determines in step S11 that the precondition is not met (S11: NO), the motion manager 45 ends the current diagnosis control. When the motion manager 45 determines in step S11 that the precondition is met (S11: YES), on the other hand, the motion manager 45 advances the process to step S21.

In step S21, the motion manager 45 determines whether the accelerator operation amount ACC meets a first specific condition determined in advance. Specifically, the motion manager 45 determines that the first specific condition is met when the amount of decrease in the accelerator operation amount ACC per unit time is equal to or more than a prescribed decrease amount determined in advance. Thus, the motion manager 45 determines that the first specific condition is met when the driver moves his/her foot away from the accelerator pedal when the driver is stepping on the accelerator pedal to a certain degree, for example. When the motion manager 45 determines in step S21 that the first specific condition is not met (S21: NO), the motion manager 45 ends the current diagnosis control. When the motion manager 45 determines in step S21 that the first specific condition is met (S21: YES), on the other hand, the motion manager 45 advances the process to step S22.

In step S22, the motion manager 45 determines whether the inter-vehicle distance DV meets a second specific condition determined in advance. Specifically, the motion manager 45 determines that the second specific condition is met when both the following requirements (2-1) and (2-2) are met.

Requirement (2-1): the inter-vehicle distance DV has become shorter. Here, the motion manager 45 determines that the inter-vehicle distance DV has become shorter when the inter-vehicle distance DV at the time of the process in step S22 is shorter than that a prescribed time determined in advance earlier. The prescribed time may be the same as the control cycle of the diagnosis control, by way of example.

Requirement (2-2): the absolute value of the amount of variation in the inter-vehicle distance DV per unit time is equal to or less than a prescribed variation amount determined in advance. Thus, in other words, the motion manager 45 determines that the requirements (2-1) and (2-2) are met when the inter-vehicle distance DV is gradually becoming shorter. When the motion manager 45 determines in step S22 that the second specific condition is not met (S22: NO), the motion manager 45 ends the current diagnosis control. When the motion manager 45 determines in step S22 that the second specific condition is met (S22: YES), on the other hand, the motion manager 45 advances the process to step S31.

In step S31, the motion manager 45 calculates an inter-vehicle time DVT. Specifically, the motion manager 45 acquires an inter-vehicle distance DV at the time when an affirmative determination is made in the process in step S22, that is, at the time when it is determined that both the first specific condition and the second specific condition are met. In addition, the motion manager 45 acquires a vehicle speed SP at the time when an affirmative determination is made in the process in step S22, that is, at the time when it is determined that both the first specific condition and the second specific condition are met. Then, the motion manager 45 calculates the inter-vehicle time DVT as a value obtained by dividing the acquired inter-vehicle distance DV by the acquired vehicle speed SP. After step S31, the motion manager 45 advances the process to step S41.

In step S41, the motion manager 45 determines whether a superiority condition determined in advance is met. Specifically, first, the motion manager 45 calculates an average value of the inter-vehicle time DVT for a period since a certain time determined in advance ago until the present. Then, the motion manager 45 determines that the superiority condition is met when the average value of the inter-vehicle time DVT is equal to or more than a reference time A determined in advance. Here, the reference time A is determined as follows, for example. First, an inter-vehicle time DVT that enables the vehicle 100 to stop at a sufficient distance from the preceding vehicle by controlling the brake device 74, even if the preceding vehicle stops abruptly, is obtained through experiments, simulations, etc. Then, a time that is longer than the obtained inter-vehicle time DVT by a certain time is determined as the reference time A. The reference time A may be several seconds, by way of example.

When the motion manager 45 determines in step S41 that the superiority condition is met (S41: YES), the motion manager 45 advances the process to step S51. In step S51, the motion manager 45 sets the superiority flag EF to ON. After step S51, the motion manager 45 advances the process to step S61.

When the motion manager 45 determines in step S41 discussed above that the superiority condition is not met (S41: NO), on the other hand, the motion manager 45 advances the process to step S52. In step S52, the motion manager 45 sets the superiority flag EF to OFF. After step S52, the motion manager 45 advances the process to step S61.

In step S61, the motion manager 45 determines whether an attention calling condition determined in advance is met. Specifically, first, the motion manager 45 calculates an attention calling time B as a value obtained by multiplying the reference time A by a coefficient α. Here, the coefficient α is larger as the vehicle speed SP at the time of the process in step S22 is higher. In addition, the coefficient α is larger when the slip flag SF at the time of the process in step S22 is ON than when the slip flag SF is OFF. Further, the coefficient α is larger as the illuminance IL at the time of the process in step S22 is lower. In general, the time required for the vehicle 100 to stop tends to be longer as the vehicle speed SP is higher, as the location at which the vehicle 100 is positioned is more slippery, and as the illuminance IL at the location at which the vehicle 100 is positioned is lower. Thus, the motion manager 45 calculates the attention calling time B as a larger value as the time required for the vehicle 100 to stop is longer when stopping the vehicle 100 by controlling the brake device 74. The coefficient α may be a value that is equal to or more than "1", by way of example. The motion manager 45 determines that the attention calling condition is met when the inter-vehicle time DVT calculated in step S31 in the current diagnosis control is equal to or less than the attention calling time B.

When the motion manager 45 determines in step S61 that the attention calling condition is not met (S61: NO), the motion manager 45 ends the current diagnosis control. When the motion manager 45 determines in step S61 that the attention calling condition is met (S61: YES), on the other hand, the motion manager 45 advances the process to step S71.

In step S71, the motion manager 45 outputs, to the display 92, a message warning that the present situation is a situation in which the inter-vehicle time DVT should be increased. As a result, the display 92 displays the warning message. After step S71, the motion manager 45 ends the current diagnosis control.

Output Control

Each time an operation to turn off the system of the vehicle 100 is performed, the motion manager 45 executes output control once before the system of the vehicle 100 is turned off. Specifically, in the output control, the motion manager 45 outputs the diagnosis result about the inter-vehicle distance DV to the display 92. Then, the display 92 displays the diagnosis result about the inter-vehicle distance DV. In the present embodiment, the diagnosis result about the inter-vehicle distance DV includes the average value of the inter-vehicle time DVT calculated in step S41 and the superiority flag EF. That is, when the superiority flag EF is ON, the motion manager 45 displays, on the display 92, a message indicating that the average value of the inter-vehicle time DVT is equal to or more than the reference time A and that, as a result, the average value of the inter-vehicle time DVT is preferable. When the superiority flag EF is OFF, on the other hand, the motion manager 45 displays, on the display 92, a message indicating that the average value of the inter-vehicle time DVT is less than the reference time A and that, as a result, the average value of the inter-vehicle time DVT should be increased. In the output control, in addition, the motion manager 45 outputs the diagnosis result about the inter-vehicle distance DV to the data center 200 via the DCM 91. As a result, the data center 200 can acquire the diagnosis result about the inter-vehicle distance DV.

Functions of Present Embodiment

It is assumed that the driver of the vehicle 100 is driving the vehicle 100 so as to follow a preceding vehicle while stepping on the accelerator pedal. It is also assumed that the inter-vehicle distance DV between the vehicle 100 and the preceding vehicle is gradually becoming shorter. In this case, there is a high possibility that the driver of the vehicle 100 reduces the amount by which the accelerator pedal is stepped on at the timing when the driver of the vehicle 100 feels that the inter-vehicle distance DV has become short. In other words, there is a high possibility that the driver of the vehicle 100 has tried to accelerate or decelerate the vehicle 100 by his/her own intention while considering the behavior of the preceding vehicle when the first specific condition is met in step S21 and the second specific condition is met in step S22 as illustrated in FIG. 3. Then, there is a high possibility that the inter-vehicle distance DV at the time when both the conditions in step S21 and step S22 are met reflects the driving skills of the driver of the vehicle 100, specifically an inter-vehicle distance DV that the driver feels preferable.

Effects of Present Embodiment (1) In the present embodiment, as discussed above, a diagnosis result about the inter-vehicle distance DV is calculated based on the inter-vehicle distance DV at the time when both the conditions in step S21 and step S22 are met. Consequently, it is possible to output a diagnosis result about the inter-vehicle distance DV that reflects the driving skills of the driver of the vehicle 100. The user of the vehicle 100 can grasp the diagnosis result about the inter-vehicle distance DV via the display 92.

(2) It is assumed that the motion manager 45 determines that the first specific condition is met based on only a condition that the accelerator operation amount ACC has decreased. In this case, the first specific condition is occasionally met because of slight variation in the accelerator operation amount ACC due to an operation by the driver of the vehicle 100. In the present embodiment, in this respect, the motion manager 45 determines that the first specific condition is met when the amount of decrease in the accelerator operation amount ACC per unit time is equal to or more than the prescribed decrease amount determined in advance. Therefore, it is possible to suppress the first specific condition being met because of slight variation in the accelerator operation amount ACC due to an operation by the driver of the vehicle 100. Consequently, it is possible to appropriately acquire the inter-vehicle distance DV that the driver feels preferable when calculating a diagnosis result about the inter-vehicle distance DV.

(3) In the present embodiment, the motion manager 45 advances the process to step S31 when the motion manager 45 determines that all the conditions in step S11, step S21, and step S22 are met. The precondition in step S11 includes a requirement that the steering angle RA is within the prescribed range determined in advance including zero. That is, the motion manager 45 calculates a diagnosis result about the inter-vehicle distance DV on condition that the steering wheel is operated such that the vehicle 100 travels straight. Therefore, it is possible to suppress an inappropriate diagnosis result being calculated in a situation in which the preceding vehicle may be lost sight of, such as when the vehicle 100 changes lanes or travels through a curve, for example.

(4) Situations in which the inter-vehicle distance DV is short but in which the absolute value of the amount of variation in the inter-vehicle distance DV per unit time is relatively large may be caused by events in which the preceding vehicle brakes abruptly, another vehicle cuts in in front of the vehicle 100, etc., for example. Such situations are not directly related to the driving skills of the driver of the vehicle 100. In the present embodiment, in this respect, the second specific condition is met when the inter-vehicle distance DV has become shorter and when the absolute value of the amount of variation in the inter-vehicle distance DV per unit time has become equal to or less than the prescribed variation amount determined in advance. Therefore, it is possible to reduce the possibility that a diagnosis result is calculated based on the inter-vehicle distance DV not reflecting the driving skills of the driver of the vehicle 100.

(5) In the present embodiment, the diagnosis result about the inter-vehicle distance DV includes the inter-vehicle time DVT. The inter-vehicle time DVT is a value obtained by dividing the inter-vehicle distance DV acquired when it is determined that both the first specific condition and the second specific condition are met by the vehicle speed SP acquired when it is determined that both the first specific condition and the second specific condition are met. Thus, in the present embodiment, a diagnosis result is calculated in the form of the inter-vehicle time DVT for the vehicle 100 to reach a position at which the preceding vehicle has been present. Since an inter-vehicle time DVT converted into the unit of time is calculated in this manner, the driver etc. of the vehicle 100 can obtain a diagnosis result that is not affected by the vehicle speed SP and that is easily imaginable.

Modifications

The present embodiment can be modified as follows. The present embodiment and the following modifications can be combined with each other as long as no technical contradiction occurs.

In the above embodiment, the diagnosis control may be changed. For example, the precondition in step S11 may be changed. In a specific example, only a part of the requirements (1-1) to (1-3) may be used as the precondition in step S11. Alternatively, the precondition in step S11 may additionally include another requirement in order to remove noise in the processes in steps S21 and S22, for example.

The process in step S11 may be omitted, for example. In this case, the motion manager 45 may execute the process in step S21 when the diagnosis control is started. The first specific condition in step S21 may be changed, for example. In a specific example, the motion manager 45 may determine that the first specific condition is met when the accelerator operation amount ACC has decreased.

In step S21, the amount of operation for acceleration/deceleration of the vehicle 100 by the driver of the vehicle 100 is not limited to the accelerator operation amount ACC, for example. In a specific example, the motion manager 45 may use the amount of operation of a pedal for operating acceleration and deceleration of the vehicle 100, that is, a so-called "one pedal", instead of the accelerator operation amount ACC. In this configuration, the motion manager 45 may determine that the first specific condition is met when the amount of decrease in the amount of operation of the one pedal per unit time is equal to or more than a prescribed decrease amount determined in advance, for example. In a specific example, alternatively, the motion manager 45 may use the amount of operation of a pedal for operating deceleration of the vehicle 100, that is, a so-called "brake pedal", instead of the accelerator operation amount ACC. In this configuration, the motion manager 45 may determine that the first specific condition is met when the amount of increase in the amount of operation of the brake pedal per unit time is equal to or more than a prescribed increase amount determined in advance, for example.

The second specific condition in step S22 may be changed, for example. In a specific example, the second specific condition in step S22 may include only the requirement (2-1), of the requirements (2-1) and (2-2).

The superiority condition in step S41 may be changed, for example. In a specific example, in step S41, the motion manager 45 may compare the inter-vehicle time DVT calculated in step S31 in the current diagnosis control, instead of an average value of the inter-vehicle time DVT for a period determined in advance, with the reference time A.

The attention calling condition in step S61 may be changed, for example. In a specific example, the manner of adjusting the coefficient α in step S61 may be changed. By way of example, the coefficient α may be larger when the preceding vehicle is a large-sized vehicle than when the preceding vehicle is a small-sized vehicle. In a specific example, only a part of the condition for adjusting the coefficient α in the above embodiment may be used.

The processes about attention calling in steps S61 and S71 may be omitted, for example. For example, the configuration for calculating a diagnosis result about the inter-vehicle distance DV may be changed. In a specific example, the processes from step S41 to step S52 may be omitted. In this case, the process in step S31 corresponds to calculating a diagnosis result about the inter-vehicle distance DV. In a specific example, alternatively, the processes from step S31 to step S52 may be omitted. In this case, the motion manager 45 may determine the inter-vehicle distance DV at the time when an affirmative determination is made in the process in step S22, that is, at the time when it is determined that both the first specific condition and the second specific condition are met, as the diagnosis result about the inter-vehicle distance DV.

In the above embodiment, the output control may be changed. For example, a condition for executing the output control may be changed. In a specific example, the motion manager 45 may execute the output control each time the diagnosis control is ended.

The content of the processes in the output control may be changed, for example. In a specific example, the motion manager 45 may output the diagnosis result about the inter-vehicle distance DV to the display 92, without outputting the diagnosis result about the inter-vehicle distance DV to the data center 200. In a specific example, the motion manager 45 may output the diagnosis result about the inter-vehicle distance DV to the data center 200 via the DCM 91, without outputting the diagnosis result about the inter-vehicle distance DV to the display 92. Even in this case, the user of the vehicle 100 can grasp the diagnosis result about the inter-vehicle distance DV via a personal terminal etc. owned by the user of the vehicle 100 if the diagnosis result about the inter-vehicle distance DV is transmitted from the data center 200 to the personal terminal etc., for example.

In the above embodiment, the configuration of the vehicle 100 may be changed. For example, for the CPU 41 of the brake ECU 40, only basic components related to the motion manager 45 may be implemented by executing the motion manager app 45A stored in the storage device 42. In other words, the storage device 42 of the brake ECU 40 may store a program for executing the diagnosis control, the output control, etc. separately from a program for implementing basic components related to the motion manager 45.

The information processing device may be a component other than the brake ECU 40, for example. In a specific example, the CPU 11 of the central ECU 10 may implement the function of the motion manager 45 by executing the motion manager app 45A stored in the storage device 12 instead of the brake ECU 40. In this case, the central ECU 10 serves as the information processing device. That is, the central ECU 10, the power train ECU 20, the steering ECU 30, the brake ECU 40, and the advanced driver assistance ECU 50 may function as the information processing device.

What is claimed is:

1. An information processing device comprising one or more processors configured to
   acquire an operation amount for acceleration/deceleration of a first vehicle by a driver of the first vehicle, the operation amount being acquired from an operation of a control operated by the driver,
   acquire an inter-vehicle distance from the first vehicle to a second vehicle traveling ahead of the first vehicle,
   determine whether the operation amount meets a first specific condition determined in advance,
   determine whether the inter-vehicle distance meets a second specific condition determined in advance,
   calculate a diagnosis result about the inter-vehicle distance based on the inter-vehicle distance acquired when the one or more processors determine that both the first specific condition and the second specific condition are met, and
   output the diagnosis result.

2. The information processing device according to claim 1, wherein:
   the control is an accelerator pedal of the first vehicle;
   the first specific condition includes a condition that is met when an amount of decrease in the accelerator operation amount per unit time has become equal to or more than a predetermined decrease amount; and
   the second specific condition includes a condition that is met when the inter-vehicle distance has become shorter than the inter-vehicle distance a predetermined time earlier.

3. The information processing device according to claim 1, wherein:
   the one or more processors are configured to acquire a vehicle speed that is a speed of the first vehicle; and
   the diagnosis result includes an inter-vehicle time obtained by dividing the inter-vehicle distance acquired when the one or more processors determine that both the first specific condition and the second specific condition are met by the vehicle speed acquired when the one or more processors determine that both the first specific condition and the second specific condition are met.

4. The information processing device according to claim 1, wherein the second specific condition is a condition that is met when the inter-vehicle distance has become shorter than the inter-vehicle distance a predetermined time earlier and an absolute value of an amount of variation in the inter-vehicle distance per unit time is equal to or less than a predetermined variation amount.

5. The information processing device according to claim 1, wherein the one or more processors are configured to acquire a steering angle of a steering wheel of the first vehicle, determine whether a precondition is met, the precondition including a condition that is met when the steering angle is within a predetermined range including zero, and calculate the diagnosis result in a situation in which the precondition is met and when both the first specific condition and the second specific condition are met.

6. The information processing device according to claim 3, wherein:

the diagnosis result includes an average value of the inter-vehicle time; and the one or more processors are configured to output a first message indicating that the average value of the inter-vehicle time is preferable when the average value of the inter-vehicle time is equal to or more than a reference time, and output a second message indicating that the average value of the inter-vehicle time is to be increased when the average value of the inter-vehicle time is less than the reference time.

7. The information processing device according to claim 6, wherein the reference time allows the first vehicle to stop at a distance from the second vehicle.

8. The information processing device according to claim 1, wherein the control is an accelerator pedal of the first vehicle operated by the driver.

* * * * *